United States Patent
Moshayedi et al.

(10) Patent No.: US 8,825,941 B2
(45) Date of Patent: Sep. 2, 2014

(54) SLC-MLC COMBINATION FLASH STORAGE DEVICE

(75) Inventors: Mark Moshayedi, Newport Coast, CA (US); Seyed Jalal Sadr, Irvine, CA (US)

(73) Assignee: STEC, Inc., Santa Ana, CA (US)

( * ) Notice: Subject to any disclaimer, the term of this patent is extended or adjusted under 35 U.S.C. 154(b) by 445 days.

(21) Appl. No.: 12/492,113

(22) Filed: Jun. 25, 2009

(65) Prior Publication Data

US 2009/0327591 A1    Dec. 31, 2009

Related U.S. Application Data

(60) Provisional application No. 61/075,709, filed on Jun. 25, 2008.

(51) Int. Cl.
*G06F 12/02*    (2006.01)
*G06F 11/14*    (2006.01)

(52) U.S. Cl.
CPC .................. *G06F 11/1441* (2013.01)
USPC .......... 711/103; 711/170; 711/173; 714/47.1; 714/47.2

(58) Field of Classification Search
CPC ................. G06F 2212/72; G06F 2212/7202; G06F 2212/7205
USPC ................. 711/103, 170, 173; 714/47.1, 47.2
See application file for complete search history.

(56) References Cited

U.S. PATENT DOCUMENTS

| | | | | |
|---|---|---|---|---|
| 5,544,356 A * | 8/1996 | Robinson et al. | ............. | 707/821 |
| 5,671,388 A * | 9/1997 | Hasbun | ......................... | 711/103 |
| 5,930,167 A * | 7/1999 | Lee et al. | ................. | 365/185.03 |
| 6,041,430 A * | 3/2000 | Yamauchi | ..................... | 714/752 |
| 6,456,528 B1 * | 9/2002 | Chen | ........................ | 365/185.03 |
| 6,831,865 B2 * | 12/2004 | Chang et al. | ............. | 365/185.33 |
| 6,845,438 B1 * | 1/2005 | Tanaka et al. | ................. | 711/206 |
| 6,973,531 B1 | 12/2005 | Chang et al. | | |
| 7,120,729 B2 * | 10/2006 | Gonzalez et al. | ............. | 711/103 |
| 7,275,140 B2 * | 9/2007 | Paley | ............................ | 711/159 |
| 7,353,324 B2 * | 4/2008 | Tanaka | .......................... | 711/103 |
| 7,433,246 B2 * | 10/2008 | Lee | ........................... | 365/189.14 |

(Continued)

OTHER PUBLICATIONS

Tanenbaum, A. S. Structured Computer Organization. 1984. Prentice Hall Inc. 2nd ed. pp. 10-12.*

(Continued)

*Primary Examiner* — Sanjiv Shah
*Assistant Examiner* — Samuel Dillon
(74) *Attorney, Agent, or Firm* — McDermott Will & Emery LLP (57) ABSTRACT

Flash memory drives and related methods are disclosed that operate to keep frequently written data, which results in frequently erased blocks, in SLC flash, and relatively static data in MLC flash. A flash drive according to the present disclosure keeps track of the number of times that data for each logical block address (LBA) has been written to the flash memory, and determines whether to store newly received data associated with a particular LBA in SLC flash or in MLC flash depending on the number of writes that have occurred for that particular LBA. For each logical block sent to the flash drive, a comparison is made of the write count of the associated LBA to a threshold. If the write count is above the threshold, the logical block is written to SLC flash. If the write count is below the threshold, the logical block is written to MLC flash.

21 Claims, 9 Drawing Sheets

(56) References Cited

U.S. PATENT DOCUMENTS

| | | | |
|---|---|---|---|
| 7,529,129 B2* | 5/2009 | Roohparvar | 365/185.03 |
| 7,676,626 B2 | 3/2010 | Lee et al. | |
| 7,752,382 B2 | 7/2010 | Lasser et al. | |
| 7,797,481 B2* | 9/2010 | Lee et al. | 711/103 |
| 7,827,348 B2* | 11/2010 | Lee et al. | 711/103 |
| 7,876,616 B2* | 1/2011 | Reid et al. | 365/185.09 |
| 7,937,521 B2* | 5/2011 | Reid | 711/100 |
| 8,028,121 B2* | 9/2011 | Jeong | 711/103 |
| 8,046,526 B2* | 10/2011 | Yeh | 711/103 |
| 8,078,794 B2* | 12/2011 | Lee et al. | 711/103 |
| 8,103,820 B2* | 1/2012 | Yeh et al. | 711/103 |
| 2008/0098192 A1 | 4/2008 | Im et al. | |
| 2008/0140918 A1 | 6/2008 | Sutardja | |
| 2008/0215800 A1 | 9/2008 | Lee et al. | |
| 2009/0157950 A1 | 6/2009 | Selinger | |
| 2009/0164702 A1* | 6/2009 | Kern | 711/103 |

OTHER PUBLICATIONS

Lee, et al., "A 3.3V 4Gb Four-Level NAND Flash Memory with 90nm CMOS Technology," IEEE International Solid-State Circuits Conference, 2004, 10 pages, IEEE.

Yim, "A Novel Memory Hierarchy for Flash Memory Based Storage Systems," Journal of Semiconductor Technology and Science, Dec. 2005, pp. 262-269, vol. 5, No. 4.

* cited by examiner

Data Area (byte 0 to byte 2027)

(A)

| PS No. | Data area (byte 0 to byte 2047) | | | |
|---|---|---|---|---|
| | Sector A | Sector B | Sector C | Sector D |
| 0x00 | 512 bytes | 512 bytes | 512 bytes | 512 bytes |
| 0x01 | 512 bytes | 512 bytes | 512 bytes | 512 bytes |
| ... | | | | |
| 0x3F | 512 bytes | 512 bytes | 512 bytes | 512 bytes |

Redundancy area 1 (byte 0 to byte 31)
Redundancy area 1' (byte 32 to byte 63)

(B)

| PS No. | Redundancy area (byte 2048 to byte 2079) | | | | | | | | | | | | | | | | | | | | | | |
|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | A | B | C | D | E | F | 0 1 2 3 4 5 | 6 7 8 9 | A | B | C | D | E F |
| 0x00 | | | ECC$_A$ | | | | | | VS$_a$ | ECC$_{vsa}$ | | | | | | | ECC$_B$ | | VS$_b$ | ECC$_{vsb}$ | | ECC$_C$ | |
| 0x01 | | | ECC$_A$ | | | | | | VS$_a$ | ECC$_{vsa}$ | | | | | | | ECC$_B$ | | VS$_b$ | ECC$_{vsb}$ | | ECC$_C$ | |
| ... | | | | | | | | | | | | | | | | | | | | | | | |
| 0x3F | | | ECC$_A$ | | | | | | VS$_a$ | ECC$_{vsa}$ | | | | | | | ECC$_B$ | | VS$_b$ | ECC$_{vsb}$ | | ECC$_C$ | |

(C)

| PS No. | Redundancy area (byte 2080 to byte 2111) | | | | | | | | | | | | | | | | | | |
|---|---|---|---|---|---|---|---|---|---|---|---|---|---|---|---|---|---|---|---|
| | 0 1 2 3 | 4 5 | 6 7 | 8 9 | A B | C | D | E | | | | | | | | | | | |
| 0x00 | ECC$_C$ | VS$_c$ | ECC$_{vsc}$ | ECC$_D$ | VS$_d$ | ECC$_{vsd}$ | EraseCnt | ECC$_{Ecnt}$ | reserved |
| 0x01 | ECC$_C$ | VS$_c$ | ECC$_{vsc}$ | ECC$_D$ | VS$_d$ | ECC$_{vsd}$ | VU | ECC$_{vu}$ | |
| 0x02 | ECC$_C$ | VS$_c$ | ECC$_{vsc}$ | ECC$_D$ | VS$_d$ | ECC$_{vsd}$ | NTU | ECC$_{ntu}$ | |
| | | | | | | | reserved | | reserved |
| ... | | | | | | | | | |
| 0x3F | ECC$_C$ | VS$_c$ | ECC$_{vsc}$ | ECC$_D$ | VS$_d$ | ECC$_{vsd}$ | FPP | ECC$_{fpp}$ | reserved |

SLC-MLC COMBINATION FLASH STORAGE DEVICE

CROSS-REFERENCE TO RELATED APPLICATION

The present application claims the benefit of priority under 35 U.S.C. §119 from U.S. Provisional Patent Application Ser. No. 61/075,709, entitled "SOLID STATE DEVICE," filed on Jun. 25, 2008, the disclosure of which is hereby incorporated by reference in its entirety for all purposes.

BACKGROUND

Flash memory is an improved form of Electrically-Erasable Programmable Read-Only Memory (EEPROM). Traditional EEPROM devices are only capable of erasing or writing one memory location at a time. In contrast, flash memory allows multiple memory locations to be erased or written in one programming operation. Flash memory can thus operate at higher effective speeds than traditional EEPROM.

Flash memory enjoys a number of advantages over other storage devices. It generally offers faster read access times and better shock resistance than a hard disk drive (HDD). Unlike dynamic random access memory (DRAM), flash memory is non-volatile, meaning that data stored in a flash storage device is not lost when power to the device is removed. For this reason, a flash memory device is frequently referred to as a flash storage device, to differentiate it from volatile forms of memory. These advantages, and others, may explain the increasing popularity of flash memory for storage applications in devices such as memory cards, USB flash drives, mobile phones, digital cameras, mass storage devices, MP3 players and the like.

In addition to non-volatile flash memory, many flash storage devices include a controller and volatile memory, such as DRAM, which are used in the management of the read and write operations of the flash storage devices and in the communication between the flash storage devices and the host devices to which they are connected. For example, DRAM may contain an addressing table correlating logical addresses used by the host device with physical addresses in the non-volatile flash memory where data is stored.

Flash memory is organized into a number of blocks which are each divided into a number of smaller data units that may be referred to as segments, pages, logical blocks, etc. For example, each block may contain 128 Kbytes divided into 32 4 Kbyte segments. Flash memory writes individual segments into flash memory, but can only erase entire blocks.

A host system sends a logical block of data (e.g., 4K) addressed by a logical block address ("LBA") to the flash drive for storage. The flash drive maps the LBA to a location of a segment within a physical block in the flash memory and writes the logical block of data to that location. When new data is written to that same LBA, the flash drive remaps the LBA to a new location and marks the previous location as invalid. Eventually, blocks containing invalid segments are erased and made available for new write operations. As noted previously, flash memory can be limited in the number of times it can be erased before failure occurs. SLC flash can be erased approximately 100 times more often than MLC flash before the same number of defects (e.g., unwriteable blocks) occurs. SLC flash, however, is significantly more expensive than MLC flash.

Flash memory is limited in the number of times it can be erased before failure occurs. For example, single level cell ("SLC") flash may have an endurance life of 100K write-erase cycles before the wear begins to deteriorate the integrity of the storage. SLC flash can be erased around 100 times more often than MLC flash. While SLC flash can have a much greater endurance life than MLC flash, SLC flash is significantly more expensive than MLC flash. Accordingly, there is a need for improved techniques for more efficiently utilizing MLC and SLC flash memory for data storage.

SUMMARY

Aspects and embodiments of the of the present disclosure address problems previously noted by providing for the allocation and storage of data received from a host across multiple channels of flash memory, where each channel includes both a single level cell (SLC) flash and multi-level cell (MLC) flash memory. The resulting memory capabilities can accommodate application memory needs at desirable prices, in addition to increasing read/write performance. In some aspects, the subject disclosure provides a machine-readable storage medium including one or more sequences of machine-readable instructions for storing data in a flash storage device including SLC and MLC flash memory, wherein execution of the one or more sequences by one or more processors causes the one or more processors to perform the steps of, mapping one or more logical data blocks to a physical address of one or more channels of non-volatile memory including SLC and MLC flash memory, writing the one or more logical data blocks to a physical address of the non-volatile memory and erasing data blocks from the one or more memory channels. In certain aspects, the machine-readable storage medium further comprises instructions for creating a list of one or more metrics associated with the erasing data blocks and rewriting the one or more logical blocks to a physical address of the non-volatile memory based on the one or more metrics.

Embodiments of the present disclosure are directed to flash memory drives and related methods that operate to keep frequently written data, which results in frequently erased blocks, in SLC flash, and relatively static data in MLC flash. A flash drive according to the present disclosure keeps track of the number of times that data for each logical block address (LBA) has been written to the flash memory, and determines whether to store newly received data associated with a particular LBA in SLC flash or in MLC flash depending on the number of writes that have occurred for that particular LBA. For each logical block sent to the flash drive by the host, the host compares the write count of the associated LBA against a threshold. If the write count is above the threshold, the logical block is written to SLC flash. If the write count is below the threshold, the logical block is written to MLC flash. The threshold may be set at 0 initially, resulting in all data being written to SLC flash, and then increased as needed. When SLC flash has reached a designated capacity, blocks with the lowest write counts are moved down to MLC flash. The flash drive uses sets of link lists to keep track of a number of metrics used to manage the flash memory. A set is kept for both the SLC flash and the MLC flash in each channel of the flash drive.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

While certain embodiments are depicted in the drawings, one skilled in the art will appreciate that the embodiments depicted are illustrative and that variations of those shown, as well as other embodiments described herein, may be envisioned and practiced within the scope of the present disclosure. Accordingly, the drawings and detailed description are to be regarded as illustrative in nature and not as restrictive.

DETAILED DESCRIPTION

In the following detailed description, numerous specific details are set forth to provide a full understanding of aspects and embodiments of the present disclosure. It will be apparent, however, to one ordinarily skilled in the art that aspects and embodiments of the present disclosure may be practiced without some of these specific details. In other instances, well-known structures and techniques have not been shown in detail to for ease in comprehension.

As was noted previously, SLC flash has a relatively high endurance (e.g. more than 100K erase cycles with 10 year data retention) compared to MLC flash (e.g., having 1K erase cycle endurance with 10 year data retention). For may typical user software applications, there may be 80% of associated memory storage that is installed for the application program to run, while only 20% of the storage utilized is for user data that is changed often. As the price of SLC flash relatively high, e.g., almost double the cost of MLC, flash memory systems can be overly expensive if they consist entirely of SLC flash. On the other hand, a SSD drive that contains all MLC flash, can accordingly have reliability issues for intensive usage. To meet the needs of real word applications at a reasonable cost, embodiments of the present disclosure provide for the concurrent use of SLC flash and MLC flash for memory storage.

An aspect of the present disclosure is directed to solid state drives (SSD) that utilize flash memory that combine both SLC and MLC flash to provide high endurance of SLC flash for frequently written (or updated) data while utilizing lower cost MLC flash for data that are written (or updated) less frequently. Embodiments of the present disclosure can include SSDs that contain multiple channels of flash memory to speed up the read/write performance.

A flash drive according to the present disclosure keeps track of the number of times that data for each logical block address (LBA) has been written to the flash memory, and determines whether to store newly received data associated with a particular LBA in SLC flash or in MLC flash, depending on the number of writes that have occurred for that particular LBA. For each logical block sent to the flash drive by the host, the host compares the write count of the associated LBA against a threshold. If the write count is above the threshold, the logical block is written to SLC flash. If the write count is below the threshold, the logical block is written to MLC flash. The threshold may be set at 0 initially, resulting in all data being written to SLC flash, and then increased as needed. When SLC flash has reached a designated capacity, blocks with the lowest write counts are moved down to MLC flash. The flash drive uses sets of link lists to keep track of a number of metrics used to manage the flash memory. A set is kept for both the SLC flash and the MLC flash in each channel of the flash drive.

Figure 1:
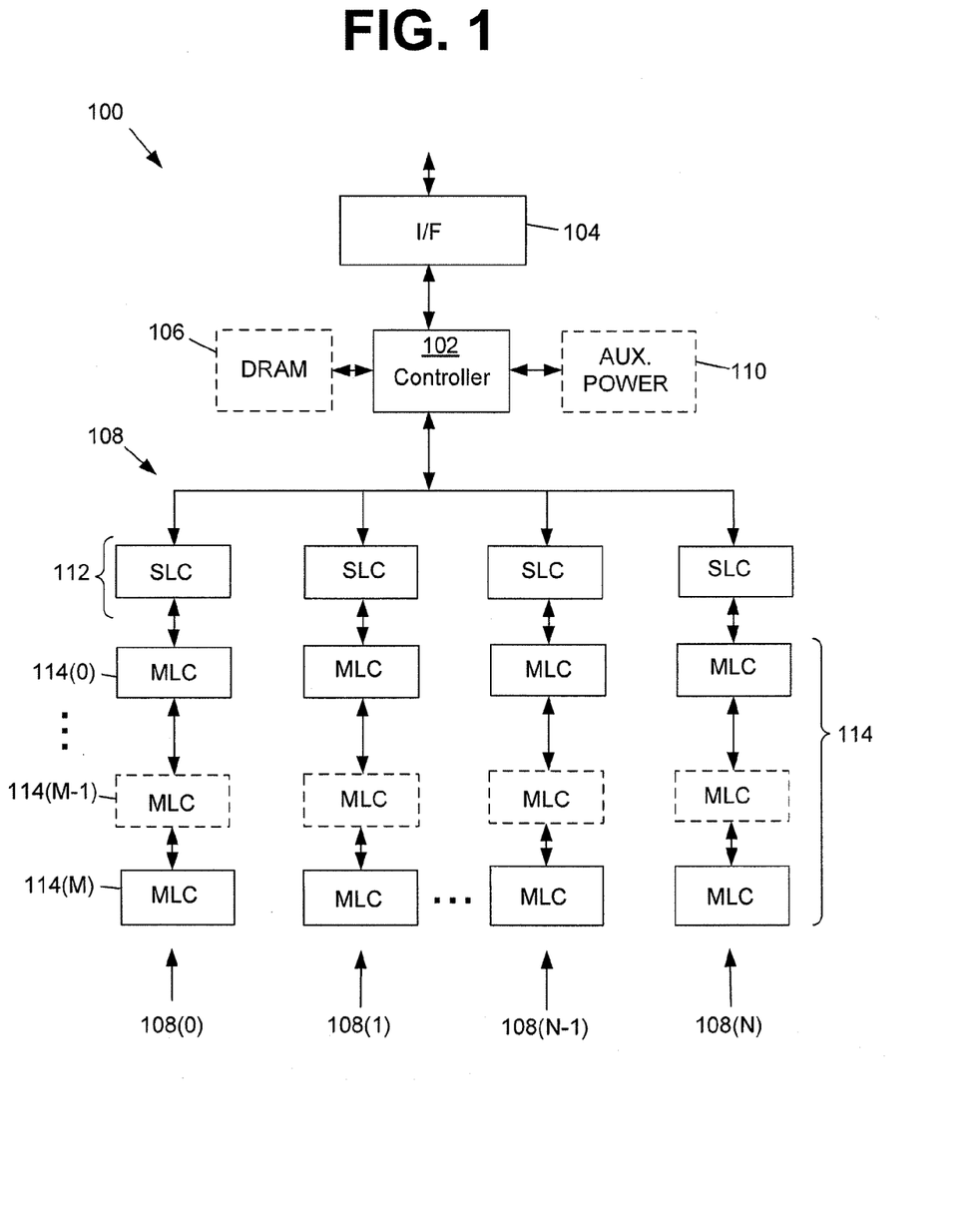
FIG. 1 depicts a schematic view of a flash storage system in accordance with exemplary embodiments of the present disclosure.

FIG. 1 is a block diagram of a multiple-channel flash storage device or SSD 100 according to exemplary embodiments of the present disclosure. The multiple-channel flash storage device 100 can include a controller 102 that is connected by way of an interface (I/F) 104 to a host system (not shown), and an array of flash memory 108. The interface 104 interfaces the flash storage device 100 to a host system, and allows the flash storage device 100 to receive data (e.g., to be written into the flash array 108) from the host system and send data to the host system (e.g., data read from the flash array 108). The controller 102 controls operations of the flash storage device 10, as discussed further below. It should be noted that, while four channels are indicated (0-3), the number of channels "N" is arbitrary and can be selected as desired. For example, exemplary embodiments, can include 4, 8, or 16, etc. channels. Various other number of channels may be used.

Each flash memory channel 108(0) to 108(N) can included or be distributed over multiple flash chips (e.g., NAND flash) that can include both SLC and MLC flash. Each of the N channels may be implemented using one or more physical I/O buses coupled between the controller 102 and respective the flash channel 108(0)-108(N). Each of the N channels allows the controller 102 to send read, write and/or erase commands to the corresponding flash memory 108(0)-108(N).

The data stored in the memory channels 108(0)-108(N) can be divided into logical data blocks. Each data block may be further divided into data segments. While the term "data block" is used throughout the description, it will be understood by those of skill in the art that the term data block is frequently used interchangeably with the term "memory block" in the art. Each data block has a plurality of data segments for storing data. In the present exemplary flash storage device, each data block is illustrated as including 16 data segments. The scope of the present invention, however, is not limited to such an arrangement. Rather, as will be apparent to one of skill in the art, a data block may be configured d with more or less than 16 data segments as desired to provide various levels of storage space. For example, in accordance with one aspect of the subject disclosure, a data block may include 32 data segments of 4 kilobytes (kB) each to provide 128 kB of data storage. While data blocks are usually configured with $2^n$ data segments (e.g., 16, 32, 64, 128, 256, etc.), the scope of the invention is not so limited. Similarly, while each data block is illustrated as including the same number of data segments, the scope of the invention is not so limited, as a flash storage device may comprise a number of data blocks with differing capacities and/or numbers of data segments. In accordance with one aspect of the subject disclosure, a data block may span over more than one flash memory chip in a storage array of multiple chips. In accordance with another aspect, a data block is stored on a single flash memory chip in a storage array of multiple flash memory chips.

Figure 2:
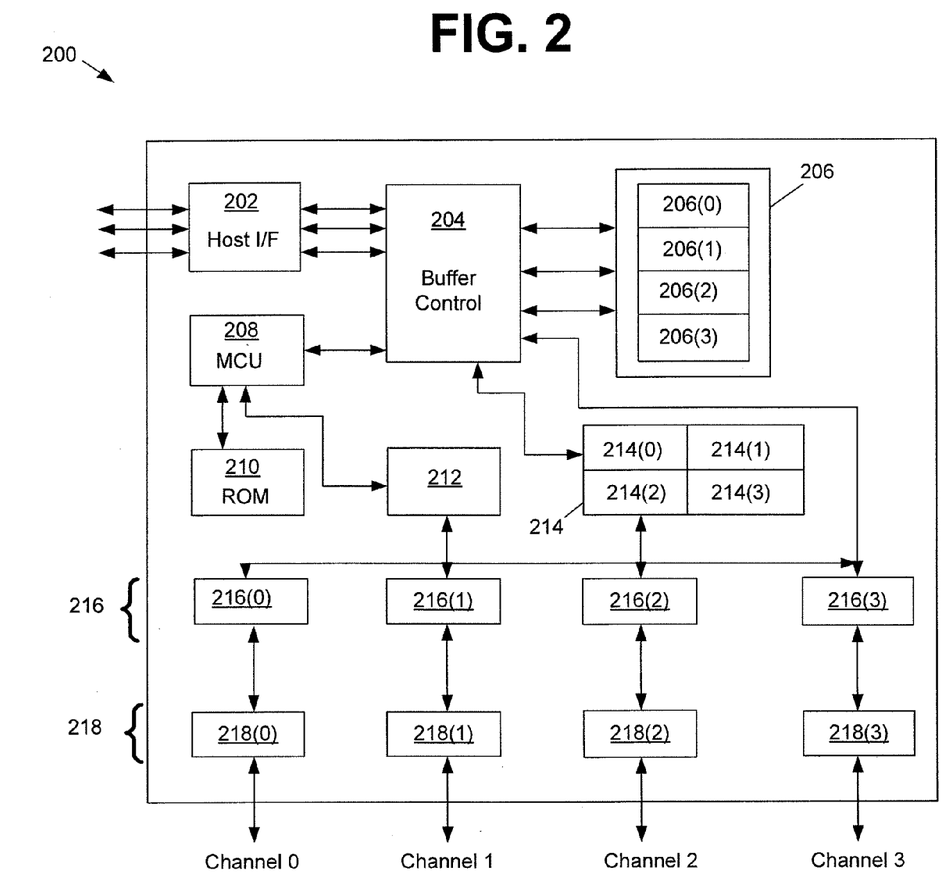
FIG. 2 depicts a schematic view of a controller architecture, in accordance with exemplary embodiments of the present disclosure.

The flash storage device (or SSD) 100 can optionally include a Dynamic Random Access Memory (DRAM) 106, as shown, though DRAM can be present in controller 102, as explained for FIG. 2. Other types of random access memory and/or volatile memory may also be used. The DRAM 106 may be used to buffer data to be written into the flash array 108. The data to be written may be incoming data from a host system and/or data being rewritten from one portion of the flash array 108 to another portion of the flash array 108. The flash storage device 100 can also optionally include an auxiliary power device 100 for providing backup power.

Flash storage device 100 can also include, employ, or be linked to a data structure or list for storing information associated with each data block in the flash memory (one or more channels). For example, a set of linked lists can be employed to track the number of valid segments in each block of flash memory (e.g., one list identifies all blocks with 32 valid segments, another lists identifies all blocks with 31 valid segments, down to the final list which identifies all blocks with no valid segments). When empty blocks are needed to write new data from the host, blocks with the least number of valid segments are selected for garbage collection, where any remaining valid segments are copied to a new block and the old block is erased.

A set of linked lists can be used for device 100 to track the relative number of times blocks have been erased based on the lowest erase count among the blocks. For example, one list may contain all blocks with erase count within 0 to 1000 of the erase count of the lowest count block, the next list may contain all blocks with erase counts that are within 1001 to 2000 of the erase count of the lowest count block, etc. When a block reaches the highest erase count list, the data contained within that block is swapped with data from a block on the lowest erase count list, which is presumed to be more static since the block containing the data has a low erase count. This wear leveling is done to keep all of the flash memory chips within a specified range of erase counts.

According to embodiments of the present disclosure, the data structures or linked lists may store information about the number of data errors that have occurred in read operations corresponding to each of the data blocks. This information may allow controller to select a data block from which to move dynamic data in favor of static data, as described in greater detail below. The data structures or linked lists may include information about the number of data read errors that have occurred in each data block since flash storage device 100 was last powered on. The data structures of linked lists may include information about the total number of data read errors that have occurred in each data block since some time prior to the last time flash storage device 100 was powered on (e.g., since flash storage device 100 was initialized, formatted, manufactured, first powered on, etc.). In accordance with still another aspect of the subject disclosure, the data structures (linked lists) may include information about the number of data read errors that have occurred in each data block both since flash storage device 100 was last powered on and since a time previous to the last time flash storage device 100 was powered on (e.g., since flash storage device 100 was initialized, formatted, manufactured, first powered on, etc.).

The flash drive may use the erase count lists to move data between MLC flash and SLC flash. For example, once a block in MLC flash reaches a threshold erase count (e.g., 500), the next write operation to that block triggers a swap where the data from the MLC flash block is written to a block in SLC flash. In this manner, data for an LBA that is frequently written and causes frequent erasures is moved to SLC flash which can perform more erase cycles than MLC flash.

Information regarding the number of data read errors associated with a given data block may be used to determine whether the data stored therein is dynamic or static. For example, if the number of read errors of a certain data block, such as data block, is below a predetermined threshold (e.g., 2), then controller may be configured to determine that the data segments therein contain "static" data. If the number of read errors of a certain data block, such as data block, meets or exceeds a predetermined threshold (e.g., 2), then controller may be configured to determine that the data segments therein contain "dynamic" data. In this way, data which is subject to more frequent write or rewrite operations (e.g., operations which may reduce the reliability of the associated data segments and/or data blocks) is determined to be dynamic data, and can be relocated to data blocks with less wear (e.g., as determined by the number of data read errors associated therewith).

While in the foregoing description, a data block has been described as being determined to contain static or dynamic data based upon a predetermined threshold of two data read errors, the scope of the present invention is not limited to such an arrangement. Rather, as will be apparent to those of skill in the art, any threshold value greater than 0 may be used to determine whether a data block contains static or dynamic data. Moreover, the predetermined threshold may be subject to change as necessary to characterize at least some of the data in flash storage device 100 as static, as is described in greater detail below. Accordingly, the terms "dynamic" and "static" are used herein to describe the relative frequency with which data is updated among data blocks in a flash storage device, and do not imply a rigid or unchanging definition. Moreover, data which is at one time determined to be static may later be determined to be dynamic, and vice versa.

The I/O interface 104 between the controller 102 and host system (not shown) may be any suitable one, e.g., including, but not limited to compact flash (CF), integrated drive electronics (IDE), advanced technology attachment (ATA), serial-ATA (SATA), universal serial bus (USB), secure digital (SD), multi-media card (MMC), fiber channel (FC), small computer systems interface (SCSI), and serial attached SCSI (SAS).

FIG. 2 depicts a schematic view of a controller architecture 200 of a controller, e.g., controller 102 of FIG. 1, in accordance with exemplary embodiments of the present disclosure. Controller 200 serves to control the writing and erasing of data (blocks/segments) to the channels of flash memory in the flash array (shown as four channels 0-3). The controller architecture 200 can include a host I/F Register and control (I/F Register) 202 connected to a buffer control 204. Buffer control 204 can be connected to a sector buffer 206, a memory control unit (MCU) 208, and RAM for virtual-to-physical mapping (V2P) 214. The MCU 208 can be connected to ROM 210 and variable RAM 212.

Sector buffer 206 is a buffer configured to transfer data from the host system (not shown) to buffer, buffer to flash and vice versa and can include a dedicated buffer for each memory channel present. For example, four sector buffers 206(0)-206(3) are shown corresponding to channels 0-3. V2P RAM 214 includes one or more tables that serve to record the physical block address of a specific virtual block. As shown, V2P 214 can include a separate buffer/list 214(0)-214(3) for each channel in the memory device, e.g., SSD 100 of FIG. 1.

Multiple channels can be used for a SSD according to the present disclosure to parallel data transfer to maximize the read/write performance. For example, each channel can connects with five chips of flash (e.g., the first chip can be a K9K8G08 SLC flash, and the rest can be K9G8G08 MLC flash). The V2P RAM for each channel can be 80K Bytes. For 4 channels SSD, V2P size is preferably 320K (or more) Bytes to support 20 G Bytes. (FIG. 2)

Figure 3:
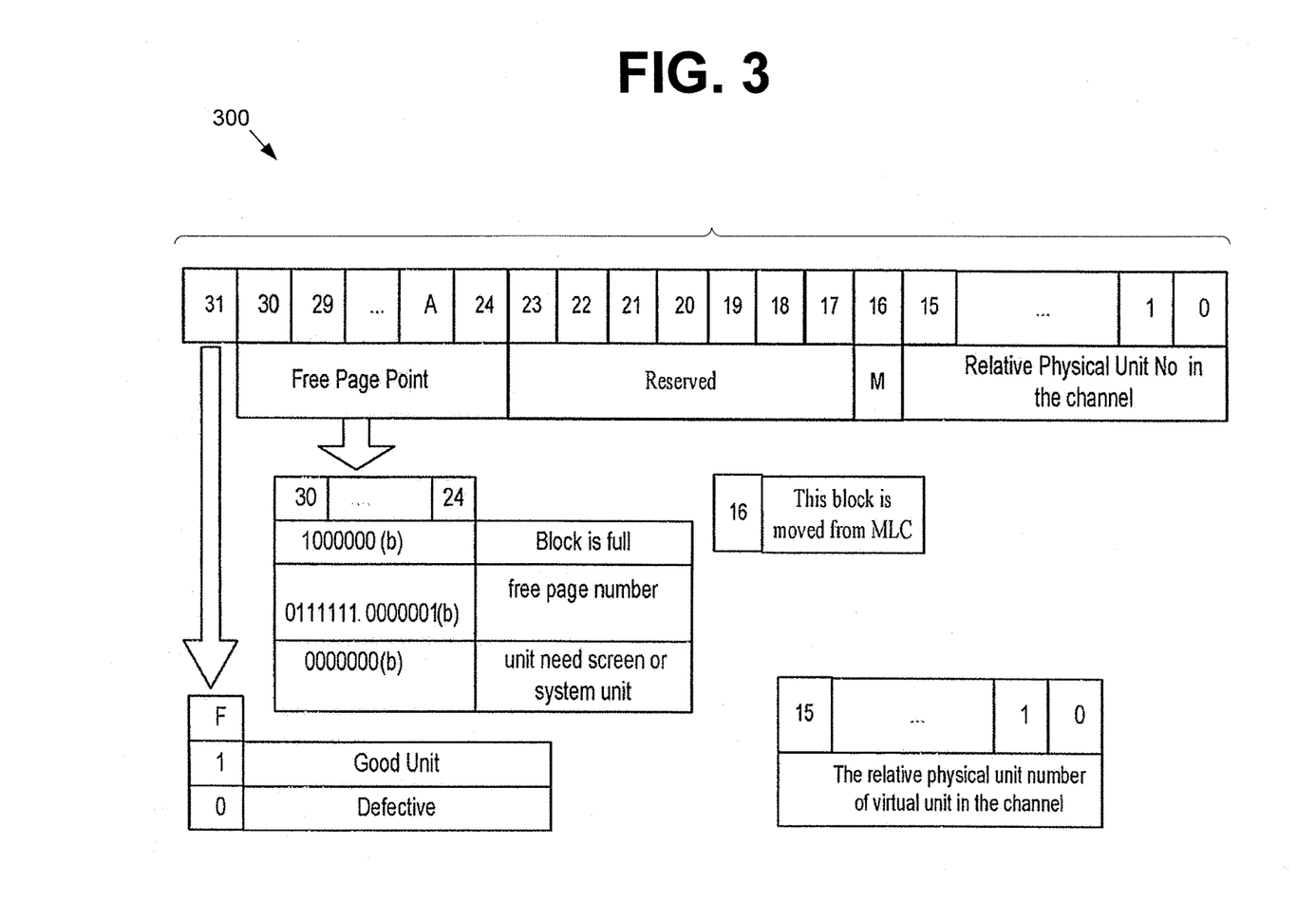
FIG. 3 depicts a schematic view of a 32 bit virtual-to-physical ("V2P") entry for a V2P table, in accordance with exemplary embodiments of the of the present disclosure.

Each V2P entry can be 32 bits, which, in exemplary embodiments, can be arranged according to the format 300 depicted in FIG. 3.

Figure 4:
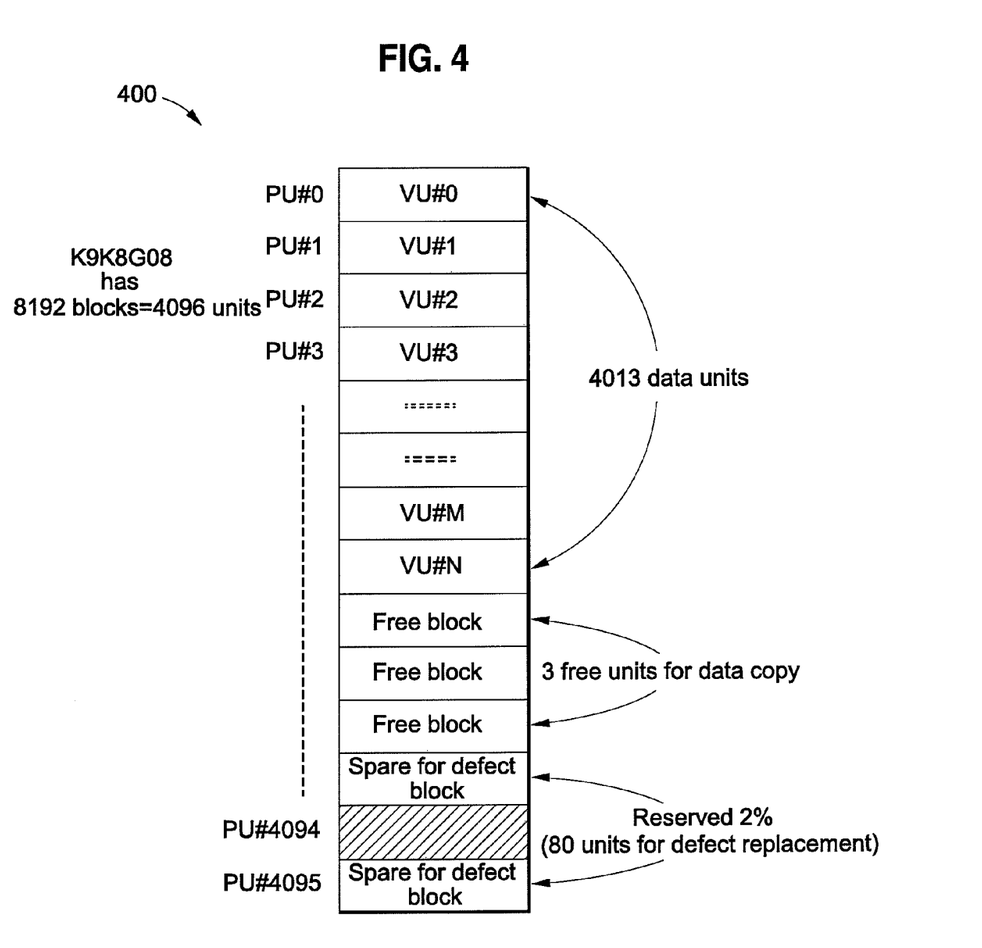
FIG. 4 depicts a schematic view of a SLC data structure outline, in accordance with exemplary embodiments of the of the present disclosure.

FIG. 4 depicts a schematic view of a SLC data structure outline, in accordance with exemplary embodiments of the of the present disclosure. For example, assuming that a SLC flash chip (e.g., K9K8G08) has 8192 blocks, it can be regarded as 4096 units (one unit is made of two blocks—one is in even plane and the other is at odd plane). As shown in FIG. 4, for such a data structure, there are 3 free units in SLC for data buffer while doing data copy. There are 80 units for defect unit's replacement unit this SLC chip. Free units also include the reserved units for defect replacement.

Figure 5:
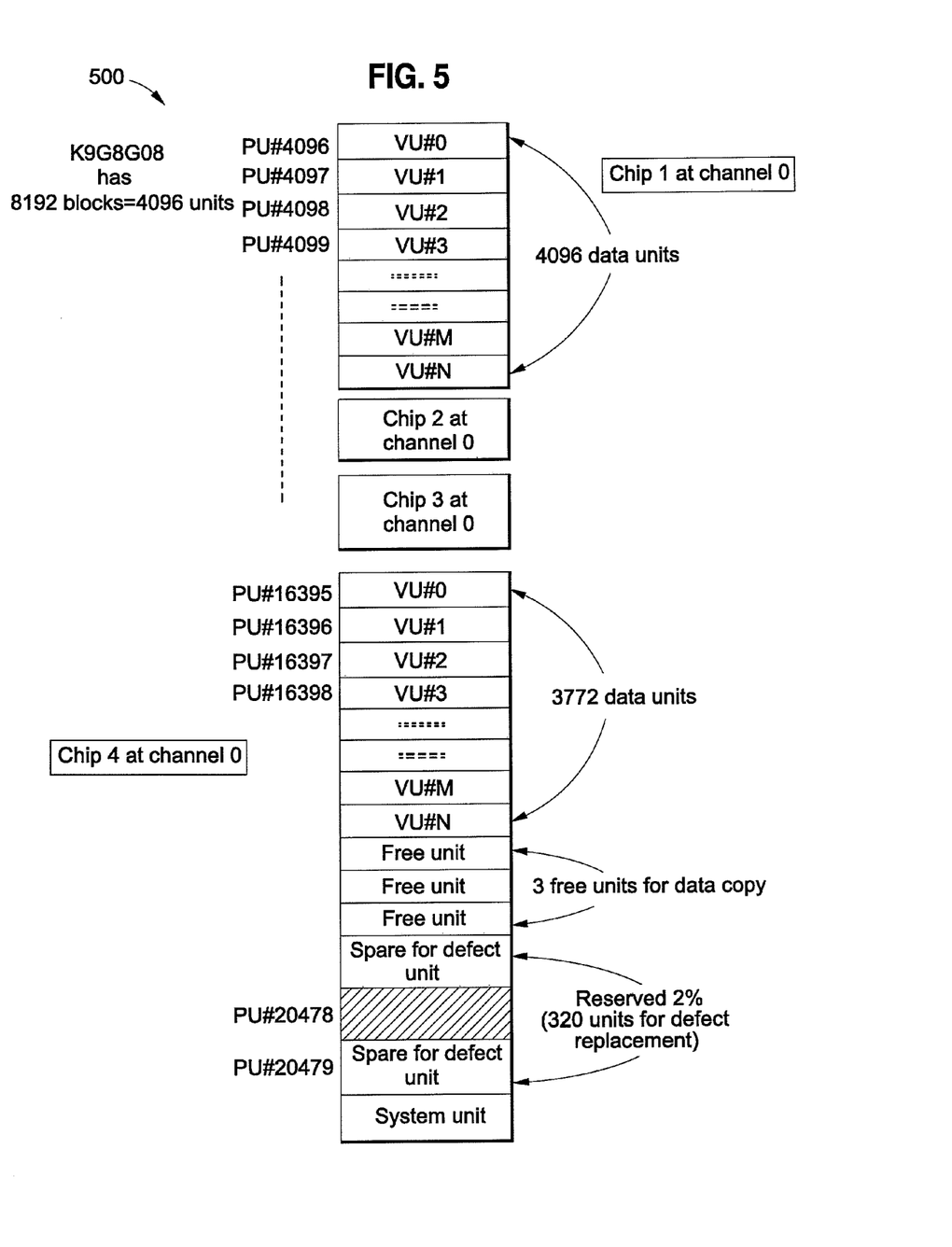
FIG. 5 depicts a schematic view of a MLC data structure outline, in accordance with exemplary embodiments of the of the present disclosure.

FIG. 5, depicts the data structure outline for MLC chips (e.g., 4 MLC chips in each channel), in accordance with exemplary embodiments of the present disclosure. In accordance with exemplary embodiments of the present disclosure, only 3 units are kept for free units as the data buffer while copying data, e.g., for the four MLC chips in exemplary channels. The reserved defect replacement units can be located at the last chip of each channel. The system unit which describes the original defect block table, on-going defect block table, and features of flash devices and systems can also be located at the last chip of each channel.

Figure 6:
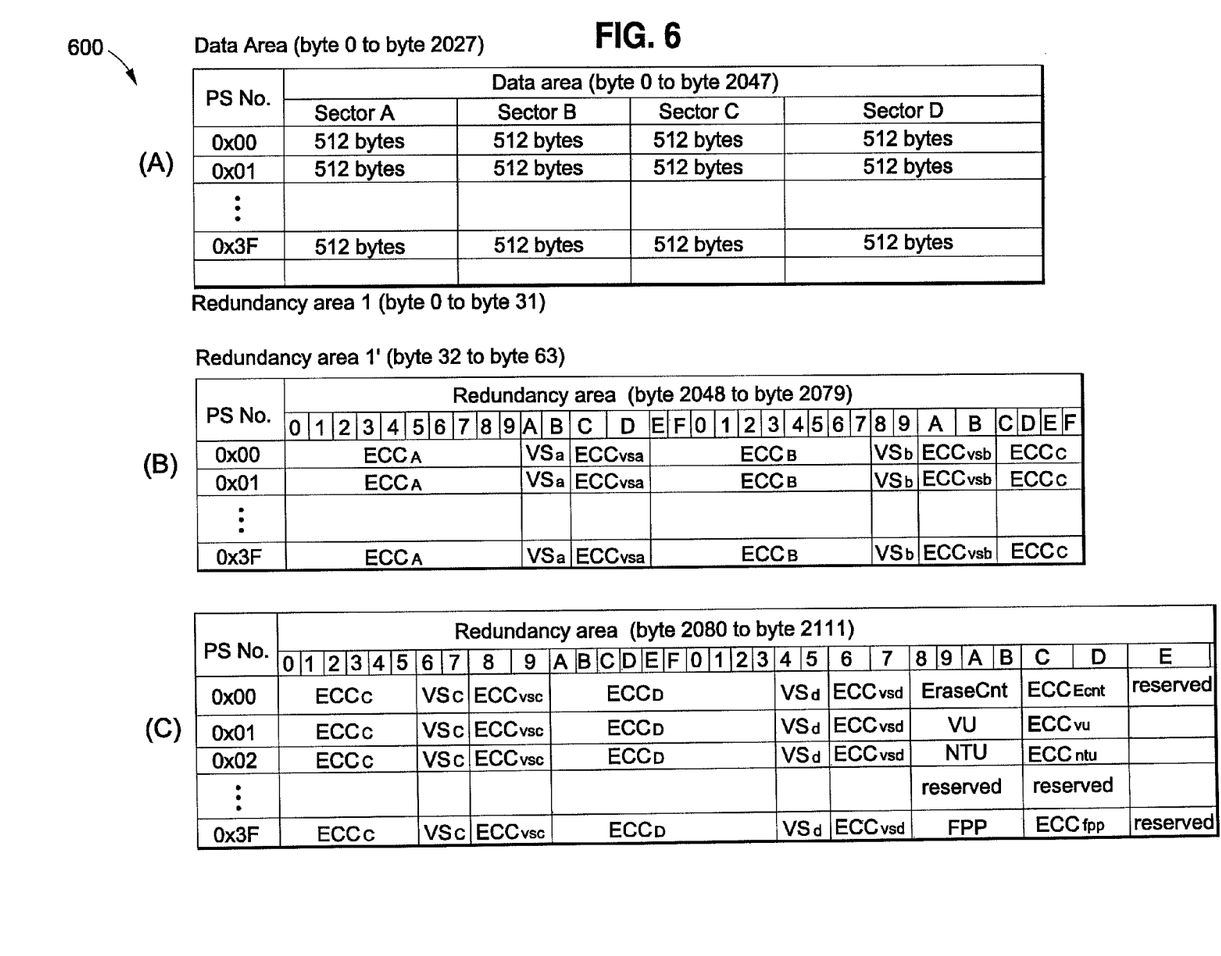
FIG. 6 depicts a schematic view of data structure within NAND flash, in accordance with exemplary embodiments of the of the present disclosure.

FIG. 6 depicts a schematic view of data structure 600 within NAND flash, in accordance with exemplary embodiments of the of the present disclosure. The data structure 600 can result after one or more pre-format procedures have occurred, e.g., procedures that search the defect blocks, build defect block tables, replacement defect block tables, and build the system units.

After a pre-format, a data block in not automatically assigned with the VU and VS. The block is free if bit 0 to bit 15 of V2P is "FFFF"H. The incoming data was written to a free block (if the corresponding V2P value is "FFFF"H). After data is written to flash, the corresponding VU is marked to the redundancy area of the block.

Through the use of dynamic assigning LBA to physical address, a block that is blank can be use as a free block as well. Thus, the maximum number of blocks for to be used as free blocks can be obtained to reduce the erase count for free block. System firmware (FW) assigns the physical address to SLC in each channel first. When the SLC is full then data will be assign to an MLC area, e.g., one of the MLC chips in a channel. For the exemplary data structure depicted in FIG. 6, there is a Data Area (byte 0 to byte 2027), a Redundancy area 1 (byte 0 to byte 31), and Redundancy area 1' (byte 32 to byte 63). In FIG. 6, for the data structure shown, ECCNTU is the ECC of NTU, ECCVU is the ECC of VU, Ecount is the erase count of the block, *) FPP=Free Page Pointer, ) DFPP is the ECC of FPP, VSECC is the ECC of VS, and VU virtual unit number during one channel. NTU represents the new physical unit number during one channel. EraseCnt is the erase count of the physical unit. When a value is "FEFEH" it indicates that the erase count of this block is more than 1000 and has been moved from SLC to MLC. In such a case, the bit 16** of V2P table can be marked as "1" as shown.

For the initialization of exemplary embodiments, FW can read the second page of every block to find the W value. The block which is system unit, free units, reserved units for defect replacement are marked "FFFF"H at bit 0 to bit 15 of V2P. The bit 31 is marked "On" when the unit is defect unit, system unit, free units and reserved units for defect replacement. The physical block address can be written into bit 15 to bit 0 of V2P during one channel at the V2P address 4× the value of W.

Figure 7A:
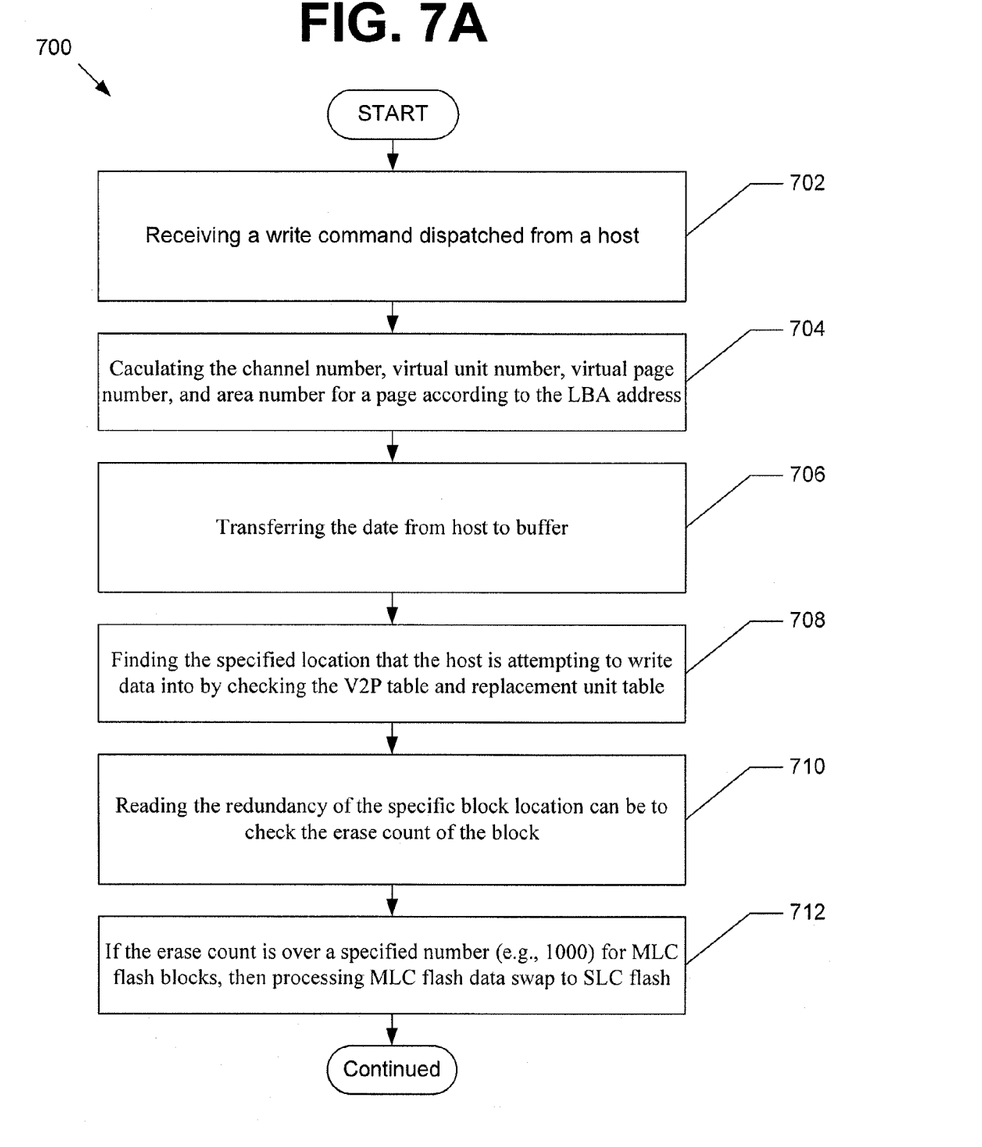
FIGS. 7A-7B depict a method of writing to flash memory, in accordance with exemplary embodiments of the present disclosure.
Figure 7B:
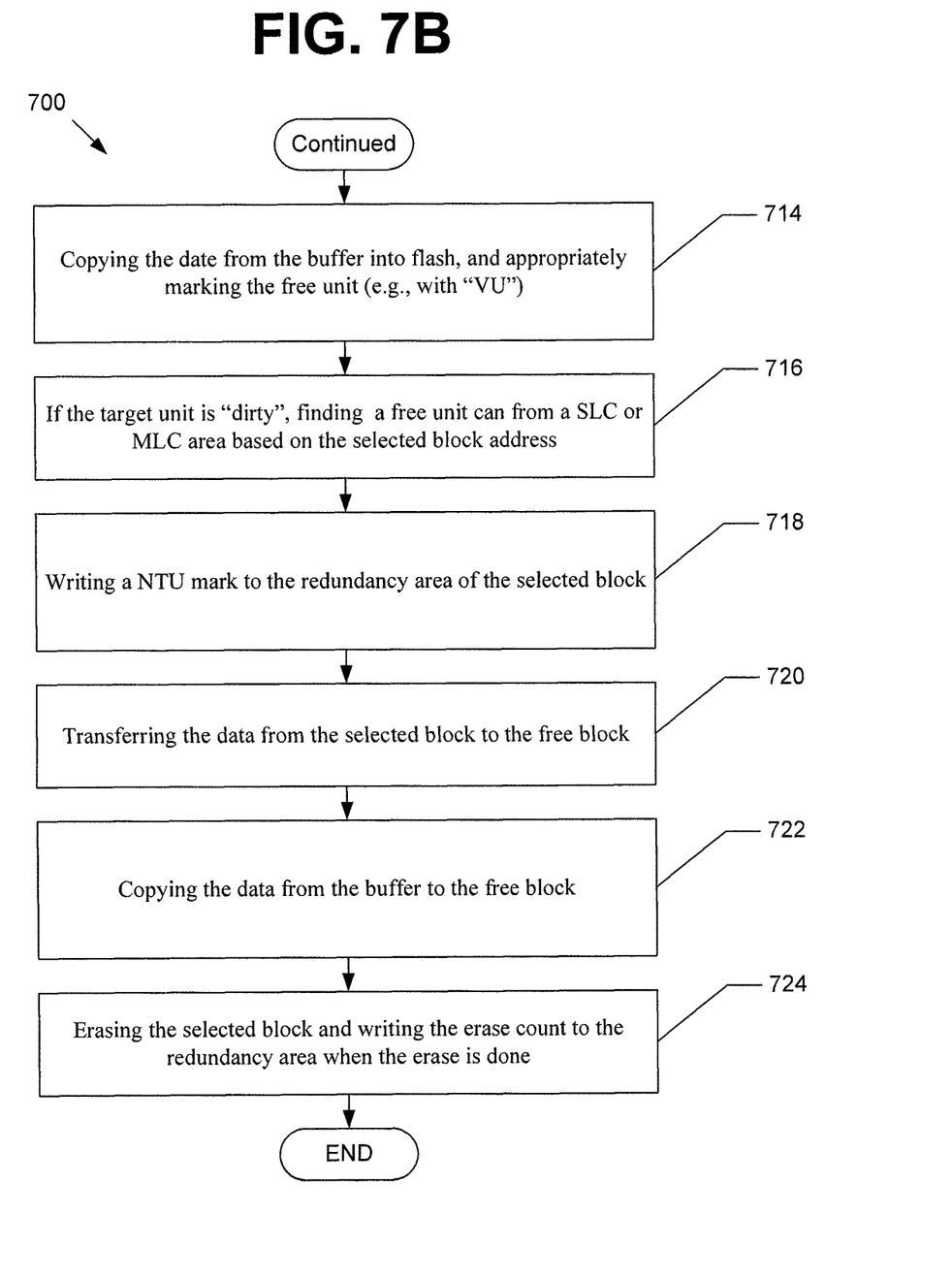

For an exemplary read flow, (1) the host I/F can dispatch the "read" command. (2) the channel number, virtual unit number, virtual page number and area number during one page according the LBA address received from host can be calculated. (3) Look up table from the V2P table of the selected channel number. Find the chip number during the selected channel and physical block number during the selected chip through the V2P look-up table and check whether the block is good or defect. (4) If the block is good and has value in bit 0 to bit 15, read the data from the page number (equal to virtual page number) and the area number (same as virtual area number). (5) If the block is good and bit 0 to bit 15 of V2P is "FFFF", data can be read from a free page of system unit to sector buffer. (6) If the block is defect, the replacement unit table (RUT) can be looked up from system unit to get the replaced block. The replaced block location can be found using the page number, area number to read out the expected data to sector buffer. (7) Follow the ATA protocol to transfer the data to host FIGS. 7A-7B depict a method 700 of writing to flash memory, in accordance with exemplary embodiments of the present disclosure. For method 700, the host I/F can dispatch a "write" command, as described at 702. Calculations can be made for/of the channel number, virtual unit number, virtual page number, and area number for a page according to the LBA address received from the host, as described at 704. An appropriate protocol (e.g., "ATA") can be followed to transfer the date from host to buffer, as described at 706. The specified location (channel, chip, block, page and area number) can be found that the host is attempting to write data into by checking the V2P table and replacement unit table (RUT) if the block is defective and if the block is free, as described at 708. The redundancy of the specific block location can be read to check the erase count of the block, as described at 710. If the erase count is over a specified number (e.g., 1000) for MLC flash blocks, then process MLC flash data swap to SLC flash, as described at 712. The purpose is to keep frequently updated data in a SLC area.

Turning attention to FIG. 7B and continuing with the description of method 700, if the target address is found to be blank, a free block can be obtained from V2P. The data can be copied from the buffer into flash, and the free unit can be marked with "VU," as described at 714. If it is found that the target unit is "dirty" or unwriteable, a free unit can be found from a SLC or MLC area based on the selected block address, as described at 716. A NTU mark can be written to the redundancy area of the selected block, as described at 718. The data can be transferred from the selected block to the free block, as described at 720. The data can be copied from the buffer to the free block, as described at 722. The rest of the data of the selected block can be copied to the free block, and the "VU" mark can be written to the redundancy of the free block. The selected block can be erased, and the erase count can be written to the redundancy area when the erase is done, as described at 724. The block can be added to the free block, changing the V2P RAM.

Figure 8:
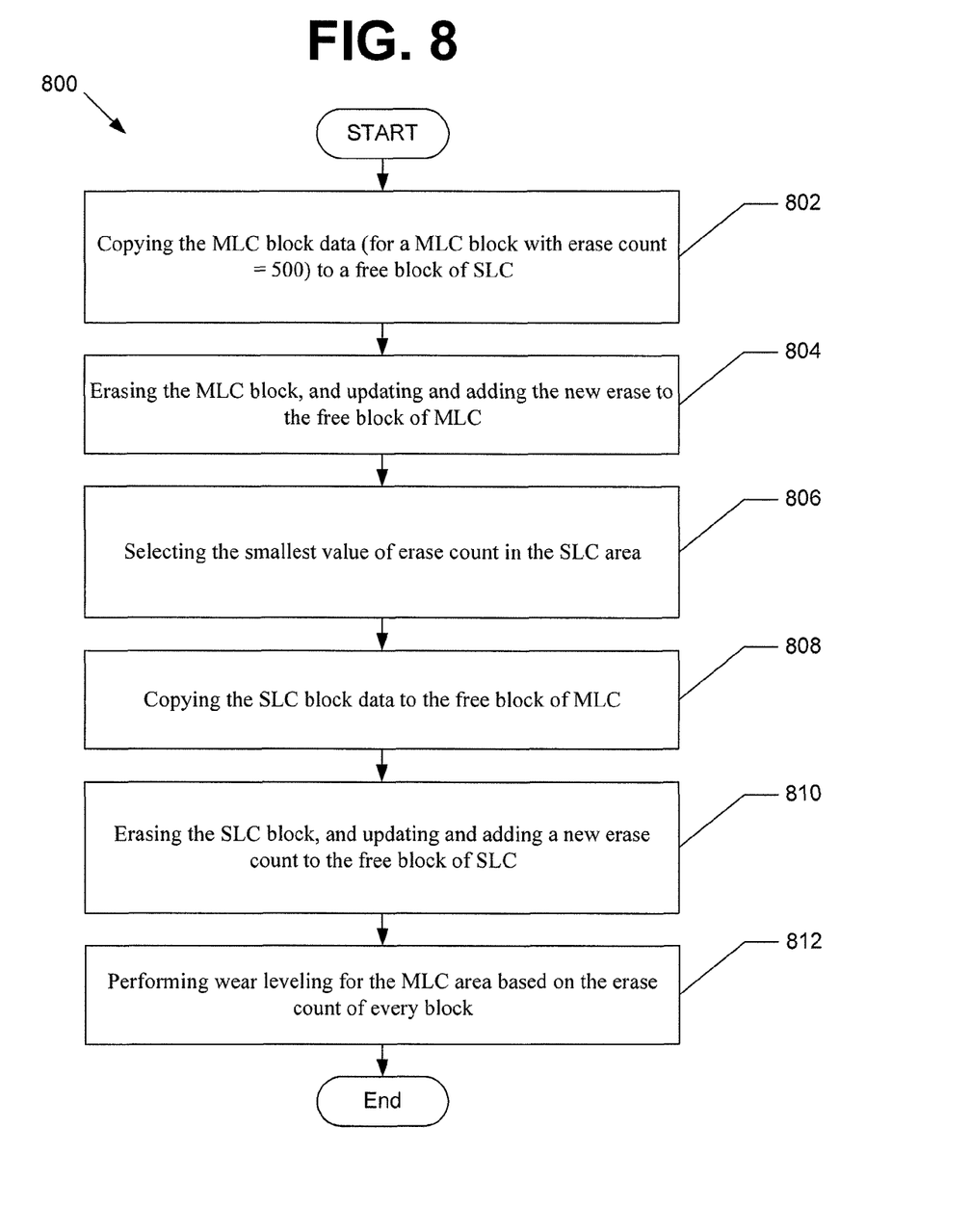
FIG. 8 depicts a method of swapping data between MLC flash and SLC flash, in accordance with exemplary embodiments of the present disclosure.

FIG. 8 depicts a method 800 of swapping data between MLC flash and SLC flash, in accordance with exemplary embodiments of the present disclosure. When the erase count of a particular block is below a specified threshold (e.g., 1000), the wear leveling is during either SLC area or MLC area. When the erase count of a block at MLC area is less than a specified threshold (e.g., 500) the next written data can be moved to a SLC area with erase count less than, e.g., 500. For example, the MLC block data (for a MLC block with erase count=500) can be copied to a free block of SLC, as described at 802. The MLC block can then be erased, and the new erase count updated and added to the free block of MLC, as described at 804. The smallest value of erase count in the SLC area can be selected, as described at 806. That SLC block data can be copied to the free block of MLC, as described at 808. The SLC block can be erased, and a new erase count can be updated and added to the free block of SLC, as described at 810. While the erase count of all blocks at SLC areas is more than (e.g., 1000), new data can be written to a MLC area having an erase count of 1000 or more. The block will do the wear leveling for the MLC area based on the erase count of every block, as described at 812. When the erase count of the block is less than 1000, wear leveling can be applied to either SLC area or MLC area. When the erase count of the block at MLC area is 500, next written data cab require the data to move to SLC area which erase count is less than 500. The drive can report a status, e.g., "drive has become unreliable" through smart commands when the erase count of the whole MLC (all of the blocks) block is over a specified amount (count), e.g., 1000.

For some applications, e.g., when a drive his little or no stored data, the whole NAND flash area (SLC and MLC) may be used for writes, as described herein. Doing so will give better performance on "new" drives until the erase counts on MLC blocks start to rise. Once erase counts have reached a given threshold on MLC (e.g., 500) data moving/swapping between MLC and SLC can implemented. For some embodiments, a data swap can happen when the SLC is full and MLC has a block with erase count over 500.

In exemplary embodiments, three "sets" of linked lists per channel are kept for SLC and two "sets" of linked lists per channel for MLC. For both types of memory, lists can be kept that give the number of times a 128K NAND block has been erased and another that holds the number of LOGICAL 4K blocks in each of the 128K NAND blocks. The additional linked list for SLC can link together the write counts for logical (4K) blocks that are residing in SLC. The number of times that each 4K logical block has been written to NAND can also kept as part of an expanded V2P table for all blocks (both SLC and MLC).

The term "sets" of link lists is used because each type of linked list consists of many individual linked lists. For example the "set" that gives the amount of user data in each NAND block has 40 individual linked lists, list 0 links all NAND blocks with 0 valid logical blocks in them (they can be erased), list 1 links blocks that have 1 valid block etc. all the way up to list 32 which lists NAND blocks that are full of user data. The other lists hold free blocks, bad blocks, blocks that are currently being written to etc. Each NAND block can (and must) be in only one list in each set. The "sets" for erase counts and write counts have 9 lists each, these lists link NAND blocks (erase counts case) and logical blocks (write counts case) that have "similar" values, so each of these lists link blocks within a lower and upper range. The erase count ranges are different for SLC and MLC and there is no write count linked list for MLC.

In exemplary embodiments, linked lists are only kept in DRAM, they aren't actually stored on power down, what is stored is just the information needed to rebuild the linked lists on start up. This cuts down the amount of data that needs to be stored when power is removed and therefore reduces the hold up time that the power backup module must provide. This information is always saved on SLC because it is faster and more robust.

In exemplary embodiments, another single linked list can also be used to link together the DRAM data cache blocks. Once the DRAM has been allocated to the various tables all remaining DRAM is used as data cache. This data cache is divided into 'logical block' (in the default case 4K) size chunks which are all chained together in a single linked list. When a cache block is needed the one on the top if the linked list is taken, so the data for this cache block is lost from the data cache, the cache block is then put onto the end of the linked list and is used to hold new data. If a block that is already cached is read or written by the host then the cache block is again moved from its current position in the linked list to the end, this means that cache blocks that are not accessed again will eventually end up at the top of the list and so will be re-used, whereas blocks that are frequently accessed will keep being put back to the bottom of the list before they reach the top and so will remain in cache. The amount of SLC that is designated to fill-up initially, before factoring write frequency and moving blocks to MLC, can be any number (%). Tested embodiments used 53%, but this is configurable.

For some applications, DRAM requirements for firmware may be reduced by the ability to change the logical block size. The firmware can be modified so that it can be compiled with a logical block sizes of 4K, 8K, 16K, 32K, 64K or 128K. The larger the logical block size the slower the random write performance, so a trade off may occur between required random writes IOPS and the amount of DRAM required.

For exemplary embodiments, fields that are periodically updated can include the lowest erase and write counts per channel. These can be updated when the base for the relative counts change. The list of bad NAND blocks (grown defect list) can be updated as NAND blocks are flagged as defective. On power down the V2P can be saved plus enough information to allow the linked lists to be rebuilt. So, a logical block may be stored in cache for a while before being written to NAND. The firmware does attempt to keep frequently written blocks in cache, however it also balances the need to ensure that data is written out to physical NAND just in case the worst should happen and something happens that causes the firmware to crash, e.g. drive is shorted out, firmware bug etc. Write data can be held in cache because it is not uncommon for the same block to be written several times in rapid succession, for instance if a file is updated or created on an NTFS file system the directory information for the file is written three or more times in rapid succession, write caching allows these multiple writes to be consolidated into a single NAND write. Data can be written out to NAND whenever enough data has been written to a single NAND channel to completely fill a 128K NAND block or if the data has been held for more than a given period of time, e.g., 10 seconds. The time limit (e.g., 10 seconds, is not guaranteed but attempts will be made to at least schedule data to be written to cache after 10 seconds. This can be done to try and ensure that if the very worst does happen only the most recent host data will be lost.

In exemplary embodiments, an algorithm can be used to calculate threshold values for writing data from SLC to MLC by continuously calculating a write count threshold value for each NAND channel. The calculation can be done by searching down the linked lists that link the logical blocks with similar write counts (starting with the lowest) and picking a value that is greater than the value held in the 32 lowest value logical blocks. This can allow for a certain amount of hysteresis and may prevent data from being put into SLC and then being copied out to MLC almost immediately.

When write data is received from the host for a logical block which is already in SLC or has a write count value that is above the threshold for SLC, the write data is assigned to SLC. If write data is received for a block which is not currently in SLC and the write count value is below the threshold then the write data is assigned to MLC. When the number of host data blocks held in SLC rises above the given threshold for a channel, the data blocks that have been written the least number of times (picked up from linked list) can be copied from SLC to MLC, therefore freeing up data blocks in SLC. As the SLC is always kept full up to the given threshold (e.g., default 53% for exemplary embodiments) the MLC cannot ever become full above its limit. It should also be noted that write counts apply to how many times the logical block has been written to NAND rather than how many times it has been written to the host, k s is done to ensure that in situations where the same block is written many times in rapid succession the write count does not distort what is happening at the NAND level. E.g. It is better to keep a block that is written every hour in SLC rather than one that is written 50 times in rapid succession every 24 hours and so only gets written to NAND once.

Write Flow

The fundamental write flow is that a free block is selected as a new target block. The original data plus changed data is copied to the new target block. The new target block is marked "VU" and the original block is erased and added to the free block queue. An exemplary write flow can be as follows:

(1) The host VF dispatch the "write" command. (2) Calculate the channel number, virtual unit number, virtual page number and area number during one page according the LBA address received from host. (3) Follow the ATA protocol to transfer the data from host to buffer. (4) Find the specified location (channel, chip, block, page and area number) that host wants to write data into it through checking V2P table and RUT table if the block is defect and if the block is free. (5) Read the redundancy of the specific block to check the erase count the block. (6) If the erase count is over 1000 for MLC flash blocks then process MLC flash data swap with SLC flash. The purpose is to keep frequently updated data at SLC area. (7) If the target address is found to be blank, then a free block can be obtained from V2P. Copy the data from buffer to flash. Mark the free unit with "W" mark. (8) If the target unit is found to be already dirty (or unusable), a free unit can be found from an SLC area or MLC area based the selected block address. (9) write NTU mark to redundancy area of selected block. (10) Make up the data from selected block to free block. (11) Copy the data from buffer to free block. (12) Copy the rest data of the selected block to the free block. (13) Write the "W" mark to the redundancy of the free block. (14) Erase the selected block. (15) Write erase count to the redundancy when the erase is done. (16) Add this block to free block (change the V2P RAM).

For some application, firmware can mark or consider a data block as having failed or subject to imminent failure based on identified parameter. For example, for previously tested embodiments, firmware marked a 128K NAND block as bad under the following circumstances:

A write to the NAND block failed on two successive occasions (with an erase in between);

The NAND block failed to erase and the number of bits that did not erase would require more than 1 ECC syndrome to be corrected. (ECC hardware can correct 8); and/or 3 Reads from the NAND block had required 6 or more ECC syndromes to be corrected on more than one occasion. For some applications/embodiments it may be desirable, if 6 or more syndromes are corrected the data is moved to a new location, for the block to be marked as bad it must have failed on two different sets of read data, not the same read data read twice.

Exemplary embodiments can include SMART or intelligent functionality that flags when the number of bad NAND blocks on any single channel is getting to a critical level. Such SMART functions also can allow thresholds to be set (by the user) which will flag up an alert if the percentage of read, write or erase commands that fail in a way that cause command response to be delayed rise above the given threshold value.

In exemplary embodiments, the ratio of SLC to MLC is $1/2^N$, e.g., ½, ¼, ⅛, 1/16, etc., because that way it makes the firmware faster as it cuts down on the amount of work the CPU needs to do. This restriction can be removed, e.g., for applications where slower firmware speed is acceptable. The proportions of SLC and MLC that are made available to the user can only be set when the unit is initialized, so if these are to be changed the user would need to copy off all the data, re-initialize the unit and put the data back on again.

SLC-MLC Combination drive systems according to the present disclosure may require suitable amount of DRAM. For example, tested embodiments have utilized amounts of DRAM based on test code requiring an extra 2 Mbytes of DRAM per GB of SLC NAND and an extra 0.5 Mbytes of DRAM for each GB of user capacity when used with a 4K logical Block. Such requirements may be reduced to 64K per GB and 16K per GB respectively for a 128K logical block size.

It is not possible to operate the SLC at one logical block size and the MLC at a different logical block size. The reason for this being that it would make it extremely difficult to copy data between the two and keep track of the data. For instance if the SLC operated with a 4K logical block and the MLC with a 128K logical block it would not be possible (or desirable) to move a 4K logical block out of SLC if another 4K logical block, within what will become the same 128K MLC logical block had a high re-write count. While all these problems can, in theory, be overcome, it may be that the amount of extra work and overhead involved would negate the benefits of having a smaller block size on just the SLC anyway.

It is possible to individually specify the proportion of SLC and MLC made available to the user. For the SLC it is possible that a lower proportion of the capacity would be made available so that faster random write speeds could be obtained. In the case of the MLC the aim is to limit the number of writes done, so having a high proportion of the MLC available to the user would be the most likely scenario. Any random writes that were done to MLC would operate at reduced speed. Copies from SLC to MLC would operate OK as under these circumstances a complete NAND block is copied.

Embodiments of firmware according to the present disclosure have been written to treat the SLC and MLC as being on two different virtual channels that share the same physical channel. Other implementations may split the SLC and MLC onto different physical channels and this can easily be incorporated into the firmware.

The firmware works by tracking the number of times that each logical block is written out to NAND as a direct result of a host write operation (as opposed to wear leveling etc.). This means that it is the frequency with which a host block is written rather than the number of times that a particular NAND page is written that determines if write data is directed towards SLC or MLC. The count is incremented when the data is written to NAND rather than every time the host writes to the block because it is not uncommon (especially for directory updates etc) for the same block to be written many times in quick succession but only be written to NAND once (owing to write caching). As an example it is better to put a block that is written once every hour onto the SLC rather than a block that is written by the host 50 times in rapid succession (requiring only a single NAND write) every day.

A threshold value is periodically calculated that determines at what threshold write data for a logical block is put into SLC rather than MLC. On an initialized (new) drive this threshold is set to 0 until the SLC has a full complement of user blocks on it. Once the SLC is full the threshold value is calculated and from that point on NAND writes are directed towards SLC or MLC depending upon the frequency with which the logical block is being written out to NAND. There are many possible algorithms that could be used to determine this write threshold value, this test code works with one that tries to balance getting a reasonably accurate value while not using too much CPU power in order to obtain it.

As the level of user blocks within the SLC goes above the configured limit, the logical blocks with the lowest write count are moved from SLC to MLC, therefore freeing up space in the SLC. No converse operation is necessary (copy from MLC to SLC) as logical blocks are directed towards SLC when they are written by the host if the write count is at a sufficient level to warrant this. There are many different configurations regarding proportion of SLC to MLC, user blocks to total NAND capacity (for SLC and MLC) and what algorithm to use to calculate the threshold at which data gets written to SLC or MLC.

While some specific descriptions of aspects and embodiments of the present disclosure have been provided, there may be many other ways to implement various aspects and embodiments of the present disclosure. Various functions and elements described herein may be partitioned differently from those shown without departing from the spirit and scope of the present disclosure. Various modifications to these embodiments will be readily apparent to those skilled in the art, and generic principles defined herein may be applied to other embodiments. Thus, many changes and modifications may be made, by one having ordinary skill in the art, without departing from the spirit and scope of the present disclosure and claimed embodiments.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that are known or later come to be known to those of ordinary skill in the art are expressly incorporated herein by reference and intended to be encompassed by the following claims.

What is claimed is:

1. A method of storing data in a flash storage device comprising non-volatile memory, the non-volatile memory comprising SLC and MLC flash memory, the method comprising the steps of:
checking an erase count associated with a first data block in the MLC flash memory;
moving data stored in the first data block to a second data block in the SLC flash memory when the erase count satisfies a first threshold; and
moving the data from the second data block in the SLC flash memory to a third data block in the MLC flash memory when a write count associated with the second data block satisfies a second threshold and a number of data blocks in the SLC flash memory storing data therein satisfies a third threshold, the third data block being associated with a write count lower than the write count associated with the second data block.

2. The method of claim 1, further comprising adding the erase count to a redundancy field of the first data block.

3. The method of claim 1, further comprising comparing a write count associated with a logical block address associated with the data to another predetermined threshold.

4. The method of claim 1, wherein the first threshold is 500.

5. The method of claim 1, wherein the first threshold is 1000.

6. The method of claim 1, further comprising creating a set of linked lists that track a number of valid segments in each data block of the non-volatile memory.

7. The method of claim 1, further comprising creating a set of linked lists that track a relative number of times data blocks of the non-volatile memory have been erased based on a lowest erase count among the data blocks.

8. The method of claim 1, further comprising creating a set of linked lists that track a number of faulty data blocks in the non-volatile memory.

9. A flash storage device comprising:
a volatile memory;
one or more channels of non-volatile flash memory including SLC flash memory and MLC flash memory; and
a controller configured to:
check an erase count associated with a first data block in the MLC flash memory;
move data stored in the first data block to a second data block in the SLC flash memory when the erase count satisfies a first threshold; and
move the data from the second data block in the SLC flash memory to a third data block in the MLC flash memory when a write count associated with the second data block satisfies a second threshold and a number of data blocks in the SLC flash memory storing data therein satisfies a third threshold, the third data block being associated with a write count lower than the write count associated with the second data block.

10. The flash storage device of claim 9, wherein the one or more channels of non-volatile flash memory each comprise a SLC chip and a plurality of MLC chips.

11. The flash storage device of claim 10, wherein each of the one or more channels comprise four MLC chips.

12. The flash storage device of claim 9, wherein the processor is further configured to add the erase count to a redundancy field of the first data block.

13. The flash storage device of claim 9, wherein the processor is further configured to compare a write count associated with a logical block address associated with the data to another predetermined threshold.

14. The flash storage device of claim 9, wherein the processor is further configured to compare the erase count to a predetermined threshold.

15. The flash storage device of claim 9, wherein moving the data is further based on a set of linked lists that track a number of valid segments in each data block of the non-volatile memory.

16. The flash storage device of claim 9, wherein moving the data is further based on a set of linked lists that track a relative number of times blocks have been erased based on the lowest erase count among the data blocks of the non-volatile memory.

17. The flash storage device of claim 9, wherein moving the data is further based on a set of linked lists that track a number of faulty blocks in each data block of the non-volatile memory.

18. The flash storage device of claim 9, wherein the controller further comprises a host I/F.

19. The flash storage device of claim 9, wherein the controller further comprises a sector buffer unit having a sector buffer for each channel of the non-volatile memory.

20. The flash storage device of claim 9, wherein the controller further comprises a virtual-to-physical (V2P) table RAM unit having a V2P table for each channel of the non-volatile memory.

21. A non-transitory machine-readable storage medium including one or more sequences of machine-readable instructions for storing data in a flash storage device including SLC flash memory and MLC flash memory, wherein execution of the one or more sequences by one or more processors causes the one or more processors to perform the steps of:
  checking an erase count associated with a first data block in the MLC flash memory;
  moving data stored in the first data block to a second data block in the SLC flash memory when the erase count satisfies a first threshold; and
  moving the data from the second data block in the SLC flash memory to a third data block in the MLC flash memory when a write count associated with the second data block satisfies a second threshold and a number of data blocks in the SLC flash memory storing data therein satisfies a third threshold, the third data block being associated with a write count lower than the write count associated with the second data block.

* * * * *